Patented July 27, 1937

2,088,015

UNITED STATES PATENT OFFICE 2,088,015

UNDECYL COMPOUNDS AND METHOD OF THEIR PRODUCTION

Jacob N. Wickert, Charleston, W. Va., assignor, by mesne assignments, to Union Carbide and Carbon Corporation, a corporation of New York No Drawing. Application March 31, 1934, Serial No. 718,429

10 Claims. (Cl. 260—134)

This invention relates to the production of a new undecyl ketol and certain of its derivatives, including an undecyl alcohol and the sulphate esters thereof, which compounds have valuable detergent, emusifying, wetting, foaming, and impregnating properties that render them useful in the textile, leather and other industries.

The present invention is based in important part upon the discovery that ethylhexaldehyde will condense with acetone in the presence of an alkaline catalyst to form a ketol which is readily converted to an unsaturated ketone upon losing the elements of water; and that this ketone, upon hydrogenation, with or without subsequent sulphation of the resultant products, will yield compounds having important properties adapting them for use as detergents, wetting agents, and the like, or as starting materials for the production of such agents.

The ethylhexaldehyde may be produced by the hydrogenation of ethylpropylacrolein. The latter is formed by condensing butyraldehyde,—the addition of one molecule of the latter to the second carbon atom of a like molecule producing an aldol, which then loses the elements of water to form the unsaturated aldehyde.

The condensation of ethylhexaldehyde with acetone can be accomplished in the presence of a small amount of an alkaline catalyst such as caustic soda, preferably dissolved in methanol or other mutual solvent for the reactants.

Upon completion of the condensation, the reaction mixture is made slightly acid, to phenolphthalein, by means of a suitable acid. Unsaturated undecyl ketone is then formed by loss of the elements of water from the undecyl ketol as the acidified reaction mixture is heated to its boiling point. The mixture is fractionally distilled, preferably under subatmospheric pressure, to separate the unreacted starting material and water from the said unsaturated ketone.

The unsaturated ketone is hydrogenated under superatmospheric pressures, within the range of from 1 to 100 atmospheres, preferably up to around 900–1000 pounds per square inch, and at temperatures of from 20° C. up to about 200° C., in the presence of a hydrogenation catalyst, such as active nickel, until hydrogen absorption has substantially ceased. The reaction mixture is cooled, the catalyst filtered away, and the clear filtrate fractionally distilled, preferably under subatmospheric pressure. The undecyl alcohol present therein is separately recovered.

The alcohol can be converted to its acid sulphate by any one of several well known sulphating methods. According to one method, the undecyl alcohol is reacted with approximately an equivalent amount of equimolar proportions of 96% sulphuric acid in the presence of acetic anhydride, at low temperatures maintained preferably within the range from 0° to 10° C. The concentration of the sulphuric acid can vary considerably; or this acid or sulphuric anhydride can be used alone; and other anhydrides of organic acids, or the acids themselves, or their chlorides may be substituted for acetic anhydride.

The acid undecyl sulphate thus produced is neutralized, preferably with caustic soda or other alkaline alkali metal compound, to yield the half sodium or other salt of the undecyl hydrogen sulphate.

The reactions involved in this synthesis may be represented as follows:

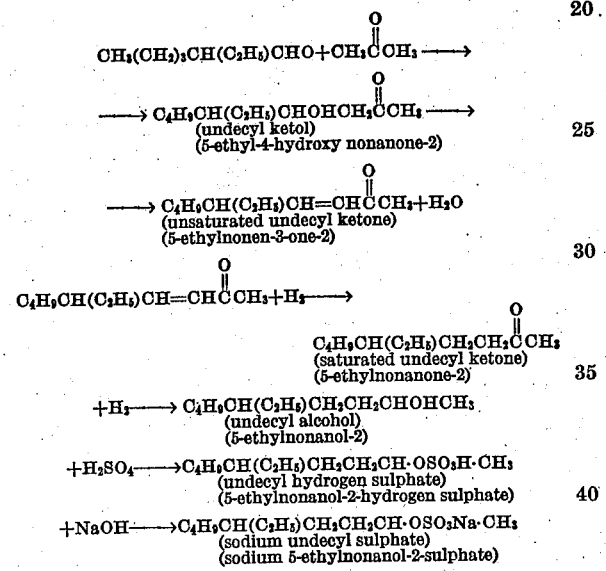

The process is illustrated by the following example:

A mixture of 15.5 kg. of α-ethylhexaldehyde and 3.5 kg. of acetone was continuously agitated during the slow addition thereto of 150 grams of potassium hydroxide dissolved in a liter of methanol,—the temperature of the mixture being carefully maintained at 20° C. during the reaction period of 26 hours. The specific gravity of the mixture at 20° C. gradually increased from 0.820 to 0.883. Dilute sulphuric acid was then added to the reaction mixture in amounts rendering it slightly acid to phenolphthalein. The inorganic salts which then separated were filtered off; and the filtrate was fractionally distilled under subatmospheric pressure. After removal of a heads cut consisting largely of unreacted ethylhexaldehyde, the unsaturated ketone was collected. The latter is a yellow-colored liquid boiling at about 105° C. at 11 mm. absolute pressure, and boiling at 229° C. at atmospheric pressure. It has a specific gravity at 20° C. of .846; and its index of refraction $n/D/20°$ C.$=1.4530$.

This unsaturated ketone was then charged into a pressure vessel, together with a small portion of an active nickel catalyst suspended in a little methanol. Generally the catalyst is used in amount from 5% to 10% of the weight of the unsaturated ketone being hydrogenated. An excess of hydrogen at pressures of up to 900 to 1,000 pounds gauge was forced into contact with the ketone in the pressure vessel while continuously agitating the mixture. The temperature of the liquid gradually rose to around 150° C. which was maintained until no more hydrogen was absorbed by the liquid. The latter was then allowed to cool, and the catalyst filtered therefrom.

This filtrate may contain varying proportions of a saturated ketone, 5-ethylnonanone-2, and of the secondary branched-chain undecyl alcohol, 5-ethylnonanol-2, depending upon the extent of the hydrogenation. The said ketone has a somewhat lower boiling point than the alcohol, and may readily be separated therefrom by fractional distillation.

The said saturated undecyl ketone has a boiling point at atmospheric pressure of 217° C., and at 9 mm. absolute pressure it has a boiling point of 93° C. Its specific gravity at 20°/20° C. is .8362; and its refractive index $n_D^{25}$ is 1.4350. It is a solvent for lacquer materials such as nitrocellulose.

The clear filtrate was fractionally distilled under subatmospheric pressure. A small heads cut was followed by a cut containing the undecyl alcohol, which alcohol may be purified by redistillation. The said alcohol boils at 105° C. at 8 mm. absolute pressure, and at 225° C. at atmospheric pressure. It has a specific gravity at 20° C. of 0.835; and its refractive index $n/D/20°$ C.$=$ 1.4400.

Both the saturated undecyl ketone and the undecyl alcohol serve effectively as lacquer solvents, readily dissolving the usual components of lacquers and being compatible with the usual lacquer solvents and diluents.

In practicing the next step of the process, the above-mentioned secondary undecyl alcohol was sulphated by dropping it slowly into a mixture of equimolar proportions of sulphuric acid and acetic anhydride, while maintaining the mixture of reactants at about 0° C. The resultant reaction product was then neutralized with caustic soda, yielding the sodium salt of the undecyl monosulphate. The latter was extracted from the inorganic salts with methanol, and was dried over a water bath under subatmospheric pressure.

The final product is a colorless solid of waxlike consistency, having strong wetting and foaming properties. A voluminous stable foam is produced when warm water containing a low concentration of this product is shaken. It lathers freely, and readily removes grease and oil from the hands and from fabrics. It is adapted to serve effectively as a textile lubricant, wetting agent, and frothing agent. It is very soluble in water, and in organic solvents such as alcohols, esters, ketones, and hydrocarbons, methanol, and its aqueous solution is unaffected by acids and alkalies. A .25% water solution of sodium undecyl sulphate has a surface tension of 40.6 dynes per cm. at 80° F. The calcium and magnesium salts present in hard waters are not precipitated by this compound, since its calcium and magnesium salts are almost as soluble as the sodium salt itself. Dilute aqueous solutions of an alkali metal undecyl sulphate when slightly acidified still retain a large proportion of their wetting and detergent properties. Such solutions evidently contain some undecyl hydrogen sulphate.

Other volatile diluents for the initial reactants and which do not take part in the reaction may be substituted for the methanol in the ketol-forming reaction. Among these may be mentioned ethanol.

Other hydrogenating catalysts such as platinum, palladium, and cobalt may be substituted for the active nickel catalyst in the hydrogenation step, though the nickel is preferred.

The neutralization of the undecyl hydrogen sulphate may be accomplished, if desired, with various alkaline compounds of the alkali metals and alkaline earth metals, such as the hydroxides and/or carbonates thereof, or with other alkaline neutralizing agents such as ammonia, the ethanolamines, and the ethylene amines.

Although the specific description of the process refers to a condensation and to a hydrogenation respectively conducted in the liquid phase, it is within the scope of the invention to conduct either or both of these steps in the vapor phase by passing mixtures of the vapors of the reactants at suitable rates through externally heated reaction tubes or chambers containing a catalyst or other suitable body of contact material.

I claim:

1. A chemical compound identical with that resulting from the partial hydrogenation of the unsaturated undecyl ketone formed by the condensation of α-ethylhexaldehyde with acetone, and acidification of the resultant reaction mixture, the same being a saturated undecyl ketone having a boiling point of 93° C. at 9 mm. pressure, and a specific gravity at 20° C. of 0.836.

2. A chemical compound identical with that resulting from hydrogenation of the unsaturated undecyl ketone formed upon neutralization of the condensation product of α-ethylhexaldehyde with acetone, the same being a secondary undecyl alcohol boiling at 225° C. at atmospheric pressure and having a specific gravity at 20° C. of 0.835.

3. A chemical compound identical with that resulting from hydrogenation of the unsaturated undecyl ketone formed upon neutralization of the condensation product of α-ethylhexaldehyde with acetone, the same being a secondary undecyl alcohol boiling at 225° C. at atmospheric pressure and having a specific gravity at 20° C. of 0.835, and having the apparent formula:

$C_4H_9CH(C_2H_5)CH_2CH_2CHOHCH_3$

4. As a chemical compound, a secondary branched-chain undecyl alcohol having a boiling point of 105° C. at 8 mm. absolute pressure and one of 225° C. at atmospheric pressure, a specific gravity at 20° C. of 0.835, and having the composition indicated by the designation: 5-ethylnonanol-2.

5. The process of making an undecyl oxygenated compound, which comprises condensing ethylhexaldehyde with acetone in the presence of an alkali, acidifying the resultant reaction product, recovering therefrom an unsaturated undecyl ketone, and hydrogenating the latter.

6. The process of making an undecyl alcohol, which comprises condensing ethylhexaldehyde with acetone in the presence of an alkali, acidifying the resultant reaction product, recovering therefrom an unsaturated undecyl ketone, and hydrogenating the latter under superatmospheric pressure in the presence of an active nickel catalyst.

7. The process of making an undecyl alcohol, which comprises condensing ethylhexaldehyde with acetone in the presence of an alkali, acidifying the resultant reaction product, recovering therefrom an unsaturated undecyl ketone, and hydrogenating the latter under superatmospheric pressures up to 1000 pounds per square inch and at elevated temperatures up to 200° C., in the presence of a hydrogenating catalyst.

8. In the process of making an undecyl oxygenated compound, the steps which comprise condensing α-ethylhexaldehyde with acetone, removing the elements of water from the resultant ketol to form an unsaturated undecyl ketone, hydrogenating the latter, distilling the hydrogenated product, and separately recovering the fraction boiling at 225° C. at atmospheric pressure and boiling at 105° C. at 8 mm. absolute pressure.

9. In the process of making an undecyl oxygenated compound, the steps which comprise condensing α-ethylhexaldehyde with acetone, removing the elements of water from the resultant ketol to form an unsaturated undecyl ketone, hydrogenating the latter, distilling the hydrogenated product, and separately recovering the fraction boiling at 217° C. at atmospheric pressure and boiling at 93° C. at 9 mm. absolute pressure.

10. A chemical compound, a saturated branched-chain undecyl ketone boiling at 93° C. under 9 mm. of mercury absolute pressure, and having a specific gravity at 20° C. of 0.836.

JACOB N. WICKERT.